United States Patent [19]
desJardins

[11] Patent Number: 4,587,578
[45] Date of Patent: May 6, 1986

[54] DIRECTIONAL CONTROL FOR TAPE REEL

[75] Inventor: Stephen R. desJardins, Mt. View, Calif.

[73] Assignee: Ampex Corporation, Redwood City, Calif.

[21] Appl. No.: 483,314

[22] Filed: Apr. 8, 1983

[51] Int. Cl.$^4$ ............................................. G11B 15/48
[52] U.S. Cl. .................................. 360/74.1; 360/74.2; 360/71
[58] Field of Search ................. 360/74.1, 74.2, 74.5, 360/71, 73

[56] References Cited

U.S. PATENT DOCUMENTS 4,396,958 8/1983 Himeno et al. .................... 360/74.1
4,402,019 8/1983 Takagi et al. .................... 360/74.1 X

FOREIGN PATENT DOCUMENTS 3108296 9/1982 Fed. Rep. of Germany ..... 360/74.1
56-148750 11/1981 Japan .................................. 360/74.1

Primary Examiner—John H. Wolff
Attorney, Agent, or Firm—Charles M. Carman; Harry G. Thibault; Joel D. Talcott

[57] ABSTRACT

A tape transport of the U-coiling type having a takeup reel that rewinds in a clockwise direction is provided with a switch reversing this direction to anti-clockwise for rewinding a Z-coiled reel, and the switch is provided with a coordinating portion that clears the tape path only for the coiling direction that corresponds with the switch setting.

8 Claims, 3 Drawing Figures

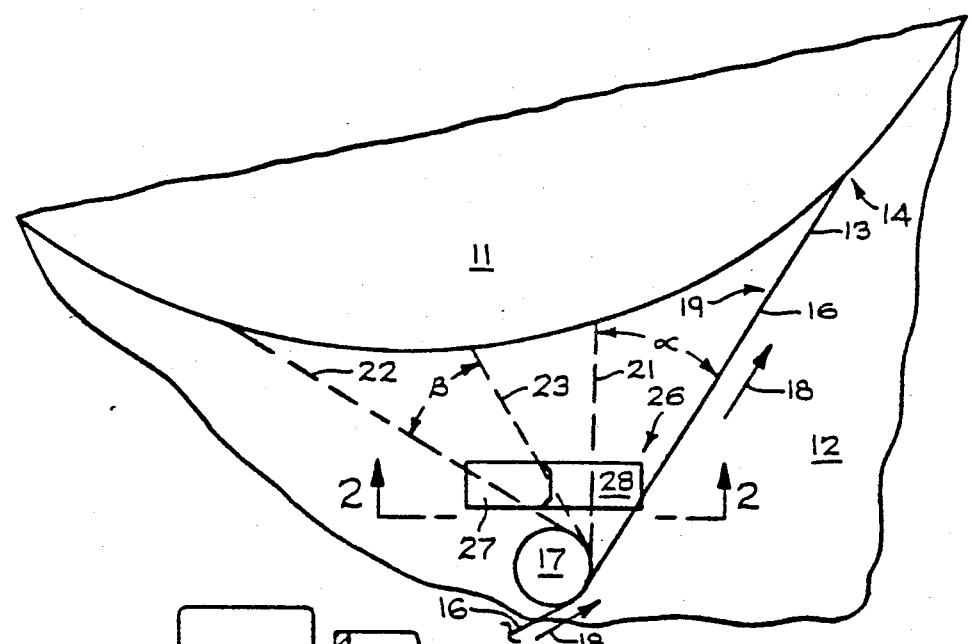
FIG_1
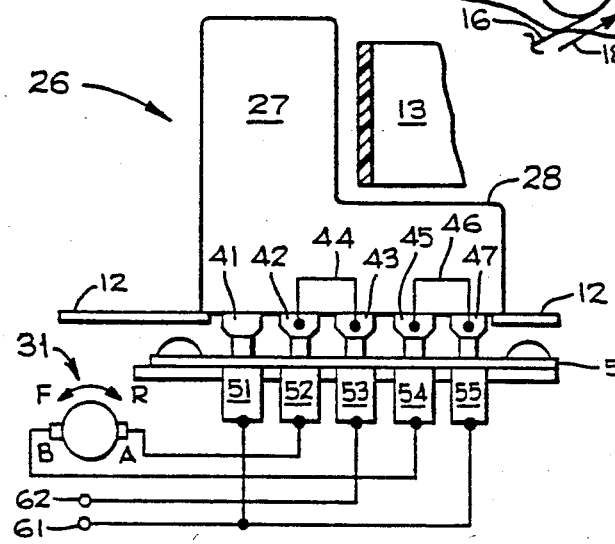
FIG_2
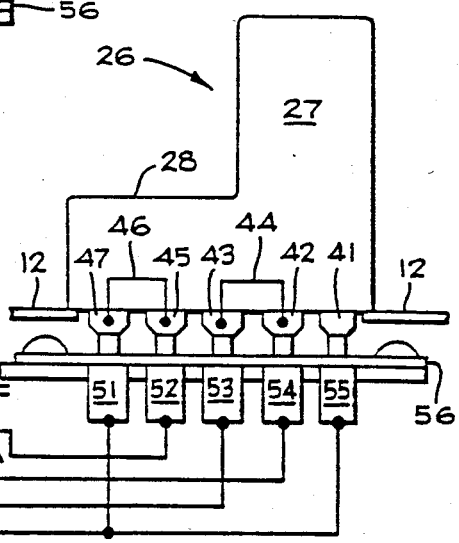
FIG_3

DIRECTIONAL CONTROL FOR TAPE REEL

BACKGROUND OF THE INVENTION

This invention relates to tape transports, and particularly to such transports having directional controls for the tape-coiling reels thereof.

Tape transports usually have hand-operable switches controlling a capstan and supply and takeup reels to move the tape in a forward direction during play and record modes of operation, and in reverse direction during the rewind mode, when the tape is uncoiled from the takeup reel and re-coiled upon the supply reel for return to storage in a ready condition for replay at some future time. Usually the supply reel is on the left, as viewed by the operator, and rotates in an counter clockwise direction during forward transport, the tape coming off in a downward direction and making a U-shaped loop past the transducing heads and up again to the takeup reel, which rotates in the same counter clockwise direction; and during rewind mode the direction is reversed, and both reels rotate in a clockwise direction. In both modes, the tape is coiled with the oxide or recorded information side radially inward on the reel, for the better protection of the information.

However, some very compact and light-weight machines are used for field work, and although they process the tape interchangeably with the heavier studio or laboratory machines, the field machines may use the so-called "Z" shaped path, which is better adapted for compact arrangement than the "U" shaped path. The supply reel on a Z-coiling machine is still coiled with the oxide side radially inward, for interchangeability with U-coil machines, and the supply reel rotational direction is still counter clockwise for forward play-record and clockwise for rewind mode. However, the tape path is arranged generally diagonally between the reels, like the middle portion of a "Z" or an "N", and the takeup reel rotates clockwise for forward play-record and counter clockwise for rewind, with the result that the tape on the takeup reel is coiled with the oxide radially outward in the tape pack. So long as some care is exercised while the tape is on the takeup reel, the damage risk is acceptable as a price for the more compact tape path.

Field transports are generally battery-operated, however, and when the transports are being used for recording live news events or on-going experiments, it becomes economical in both battery use and time use to record only in the field, then set the takeup reel aside and rewind it later on a studio "U" machine.

It has therefore become convenient to equip such a U-coiling studio machine with another switch, separate from that which changes the tape direction between play-record and rewind modes, the extra switch being used only to change the rotational direction of the takeup reel from clockwise to counter clockwise during rewind, thus transforming the machine into a Z-coiling machine temporarily.

When such a rewind switch is used, however, it is easy for the operator to become confused, and to set the switch for the wrong direction for the reel that he is rewinding; or he may forget to reset the switch for U-coil operation after he has rewound a Z-coil reel.

Accordingly, it is an object of the present invention to provide a directional-control rewind switch for a takeup reel motor that cannot easily be operated without correct coordination between the tape coil direction and the reel rotational direction.

BRIEF DESCRIPTION OF THE INVENTION

This and other objects are achieved in a tape transport of the U-coiling type by provision of a switch reversing the rewind rotational direction of the takeup reel, and this switch is provided with a coordinating portion that clears the tape path only for the coiling direction that correctly corresponds with the switch setting.

DESCRIPTION OF THE DRAWINGS

FIG. 1 is a fragmentary elevation view of a portion of a tape transport and takeup reel, with the apparatus of the invention applied thereto;

FIG. 2 is a cross-sectional view, partly in schematic form, of the apparatus, taken on the plane of lines 2—2 of FIG. 1; and FIG. 3 is a partly schematic view illustrating a different mode of use of the invention.

DESCRIPTION OF THE PREFERRED EMBODIMENTS

Referring now to FIG. 1, there is shown the lower portion of a takeup reel 11 of a U-winding tape transport 12, the tape 13 being shown as at the end of forward play-record mode, coiled substantially entirely on the reel in an counter clockwise inwardly spiraling coil 14. Only the trailing end portion 16 of the tape still extends from the supply reel (not shown), past the capstan and heads (not shown) and a guide 17, to reel 11.

During forward play-record mode, the tape moves from left to right, in the play-record mode or the direction of arrow 18 and the reel 11 rotates counter clockwise so that the tape coils onto the reel in an counter clockwise, inwardly-spiraling coil, with the oxide side 19 of the tape facing radially inwardly on the reel. During rewind mode, of course, the reel 11 rotates in a clockwise direction, and the tape moves from right to left, in a rewind mode opposite to the direction indicated by arrow 18. The tangential run of tape between guide 17 and reel 11 moves from the full-reel position shown in solid line in the Figure to the empty-reel position 21 shown in dashed line.

When it is desired to rewind a Z-coiled reel on the transport 12, the direction of rotation of the reel must be changed to counter clockwise, and the tape must be threaded from the reel from left to right as illustrated by the full-reel condition dashed line 22, and clockwise around the guide 17, thence along the usual tape path to the supply reel (not shown), which rotates in the clockwise direction during rewind. The empty-reel condition for a Z-coiled reel is shown by the dashed line 23 representing the tangential tape run from reel to guide 17.

To effect the reel direction reversal needed for rewinding a Z-coiled reel, the present invention provides a hand-operable reversing switch 26 mounted on the transport 12 very close to guide 17, so as to subtend or underlie both the angle alpha, representing the angular motion of the tangential run of tape from reel to guide 17 during rewind of a U-coiled reel, and the angle beta, representing the angular motion of the tape run during rewind of a Z-coiled reel. The closer is switch 26 to guide 17, the smaller it can be.

However, to warn the operator when the tape coiling direction is wrong for the direction of reel rotation established by the switch 26, the member 26 is provided with a directional control device in the form of an upstanding coordinating extension 27 (see FIG. 2), which obtrudes into the path of the tape (angle beta) when the switch is set for rewinding a U-coiled tape, and which conversely obtrudes into the tape path (angle alpha) when the switch is set to rewind a Z-coiled tape. The member 26 has a lower plateau 28 over which the tape 16 freely passes (FIG. 2) when the coil direction is correct for the rotational direction of the reel.

FIG. 2 illustrates the connection of switch 26 into the energizing circuit for the takeup reel motor 31. From member 26 downwardly protrude five electrical plug-in jacks in a row: a dummy jack 41 at one extremity of the row; next, a motor jack 42 and a line jack 43 internally electrically coupled as illustrated schematically by the conductor 44; and lastly, another motor jack 45 coupled internally by a conductor 46 to a second line jack 47.

The jacks plug into corresponding receptacle elements 51, 52, 53, 54 and 55, which are mounted on a bracket 56 attached to transport 12, and are electrically connected as follows:

The two receptacles 51 and 55 at the extremities of the row are both connected to one power terminal 61, so that in either position of the switch element 26, the jack 47 is connected to terminal 61 but in the U-coil rewind position of the switch (FIG. 2) the extension 27 is in position to block the beta angle tape path and it is pole B of the motor 31 that is connected through receptacle 54, jack 45, and internal conductor 46 to terminal 61; while in the Z-rewind position of the switch 26 (FIG. 3), the extension 27 is in position to block the alpha angle tape path and it is pole A of the motor that is so connected, through receptacle 52, jack 45, conductor 46, jack 47, receptacle 51.

Likewise, during U-rewind mode (FIG. 2), pole A of the motor is connected to the other power terminal 62, while in Z-rewind mode, pole B is connected to terminal 61. The polarity of terminals 61, 62, when connected to a power source (not shown), is such that the motor 31, when energized, rotates the reel clockwise for U-rewind (FIG. 2) and counter clockwise for forward motion, but for Z-rewind (FIG. 3), counter clockwise for rewind and clockwise for forward modes.

What is claimed is:

1. A directional control for the drive motor of an information storage unit of the type including a tape coiled on a reel in one of two coiling directions and respective tape paths, wherein:
a directional control means is provided having first and second conditions in which said motor is energized for rotation in opposite directions; and
interfering means associated with said control means and said unit and responsive to the condition of said control means to block a first tape path and clear a second tape path, in accordance with the coiling direction of said tape on said reel.

2. A control as recited in claim 1, wherein information is stored on only one side of said tape, and said one side faces radially inwardly when said tape is coiled in a first of said directions, but radially outwardly when the tape is coiled in the second other direction; and
said interfering means is arranged to interact with said storage unit in a first mode defined in one control means condition and one coiling direction, and in a second mode defined in said one control means condition and the other coiling direction.

3. A control as recited in claim 2, wherein said tape extends in a run tangentially from said reel, and said tape run engages said interfering means to define the first interaction mode thereof in the first condition of said control means and the first coiling direction of said tape, and also in the second condition of said control means and the second coiling direction of said tape, but is disengaged from said interfering means to define the second interaction mode in the first control means condition and the second coiling direction, and also in the second control means condition and the first coiling direction.

4. A control as recited in claim 3, wherein said motor has a play-record mode of operation and a rewind mode, and said motor is energized during said rewind mode to drive said reel in an unwinding direction of said tape with said control means in first condition and said tape coiled on said reel in the first coiling direction.

5. A control as recited in claim 4, wherein said reel and motor form part of a tape transport machine that includes a guide element adjacent said reel, with said tangential tape run extending, in the first mode of interaction, immediately from said reel to said guide, and, in the second interaction mode, immediately from said reel to said interfering means.

6. A tape feed controlling means for use in rewinding a Z-coiled takeup reel on a U-coiling tape transport that includes a takeup motor for rewinding both U-coiled and Z-coiled tape takeup reels;
said means being connected to control the energizing circuit of said motor so that in the rewind mode of said transport, said Z-coiled reel is caused to rotate in an unwinding direction in a first position of said switch, and so that a U-coiled reel is caused to unwind in a second position of said switch.

7. A tape feed controlling means as recited in claim 6, wherein said unwinding directions are respectively clockwise for a U-coiled reel, and counter clockwise for a Z-coiled reel.

8. A tape feed controlling means as recited in claim 7, wherein said means is a hand-operable switch member positioned near the takeup reel position on said transport and having an upstanding portion obtruding into the path of said tape immediately proximal to said reel position only in a first switch position when said reel is U-coiled, and also only in a second switch position when said reel is Z-coiled.

* * * * *